(12) United States Patent
Marchini et al.

(10) Patent No.: US 8,979,519 B2
(45) Date of Patent: Mar. 17, 2015

(54) METHOD AND APPARATUS FOR MANUFACTURING PNEUMATIC TYRES

(75) Inventors: Maurizio Marchini, Milan (IT); Fiorenzo Mariani, Milan (IT); Pierangelo Misani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 114 days.

(21) Appl. No.: 13/083,878

(22) Filed: Apr. 11, 2011

(65) Prior Publication Data

US 2011/0189330 A1    Aug. 4, 2011

Related U.S. Application Data

(62) Division of application No. 11/793,010, filed as application No. PCT/IT2004/000732 on Dec. 28, 2004, now Pat. No. 8,007,710.

(51) Int. Cl.
     *B29D 30/08*      (2006.01)
     *B29D 30/06*      (2006.01)
     *B29C 43/02*      (2006.01)
     (Continued)

(52) U.S. Cl.
     CPC ........ *B29D 30/0605* (2013.01); *B29D 30/0602* (2013.01); *B29C 33/08* (2013.01); *B29C 43/021* (2013.01); *B29C 43/104* (2013.01); *B29C 2043/023* (2013.01); *B29D 30/06* (2013.01); *B29D 30/0661* (2013.01)
     USPC .............................................. 425/44; 425/46

(58) Field of Classification Search
     CPC ........... B29D 30/0605; B29D 30/0629; B29D 30/0602; B29D 30/0661; B29D 2030/063
     USPC ................ 156/130.5, 381, 382, 421.2, 421.6; 264/501, 502, 526, 326; 425/36, 46, 425/47, 40, 44, 50, 501
     See application file for complete search history.

(56) References Cited

U.S. PATENT DOCUMENTS

| | | | |
|---|---|---|---|
| 1,394,928 A | | 10/1921 | Midgley et al. |
| 1,587,543 A | * | 6/1926 | Midgley ........................ 264/236 |
| 3,553,309 A | * | 1/1971 | Pacciarini ..................... 264/313 |

(Continued)

FOREIGN PATENT DOCUMENTS

| | | |
|---|---|---|
| DE | 2 113 698 | 9/1972 |
| EP | 0 685 321 B1 | 6/1995 |

(Continued)

OTHER PUBLICATIONS

Shimizu, "Tire Vulcanizing Mold," Patent Abstracts of Japan of JP Publication No. 08 142057, published Jun. 4, 1996.

(Continued)

*Primary Examiner* — Martin Rogers
(74) *Attorney, Agent, or Firm* — Finnegan, Henderson, Farabow, Garrett & Dunner, L.L.P.

(57) ABSTRACT

A green tire disposed on a toroidal support is introduced into a vulcanization mold. The mold is closed through axial approaching of a pair of sidewall plates acting against the sidewalls of the tire. Circumferential sectors set to operate against the tire tread band are maintained spaced apart from the tread band itself during admission of a working fluid designed to press the tire against the toroidal support. Subsequently, the sectors are centripetally approached for penetration into the tread band concurrently with a step of full molding and vulcanization of the tire carried out through admission of steam under pressure into the tire itself.

16 Claims, 3 Drawing Sheets

(51) Int. Cl.
  *B29C 43/10* (2006.01)
  *B29C 33/08* (2006.01)

(56) References Cited

U.S. PATENT DOCUMENTS

| | | | |
|---|---|---|---|
| 3,682,576 A * | 8/1972 | Gross | 425/46 |
| 3,730,658 A * | 5/1973 | Marra | 425/47 |
| 3,787,155 A * | 1/1974 | Zangl | 425/47 |
| 3,806,288 A | 4/1974 | Materick | |
| 3,853,666 A | 12/1974 | Barefoot | |
| 3,990,823 A * | 11/1976 | Le Moullac | 425/47 |
| 4,022,554 A * | 5/1977 | MacMillan | 425/23 |
| 4,383,808 A * | 5/1983 | Kubo et al. | 425/47 |
| 4,957,676 A * | 9/1990 | Greenwood | 264/102 |
| 5,164,199 A * | 11/1992 | Fujieda et al. | 425/33 |
| 5,492,464 A * | 2/1996 | Irie | 425/34.1 |
| 5,585,064 A * | 12/1996 | Moris-Herbeuval et al. | 264/501 |
| 5,700,339 A | 12/1997 | Billieres | |
| 6,332,999 B1 | 12/2001 | Caretta | |
| 2002/0053759 A1 | 5/2002 | Caretta | |
| 2002/0142056 A1 | 10/2002 | Aperce et al. | |
| 2003/0091671 A1 | 5/2003 | Serener-Thielmann | |
| 2005/0112222 A1* | 5/2005 | Kata | 425/35 |
| 2009/0008024 A1 | 1/2009 | Marchini et al. | |

FOREIGN PATENT DOCUMENTS

| | | |
|---|---|---|
| EP | 0 928 680 A1 | 7/1999 |
| EP | 0 976 533 A2 | 2/2000 |
| EP | 1 038 657 A1 | 9/2000 |
| EP | 1 172 198 A2 | 1/2002 |
| JP | 2006506254 | 2/2006 |
| RU | 2 129 487 C1 | 4/1999 |
| RU | 2 147 519 C1 | 4/2000 |
| WO | WO 01/00395 A1 | 1/2001 |
| WO | WO 2004/045837 A1 | 6/2004 |
| WO | WO 2004/045838 A1 | 6/2004 |
| WO | WO 2006/070412 A1 | 7/2006 |

OTHER PUBLICATIONS

Japanese Patent Office, Notice of Reasons for Rejection, Nov. 30, 2010, 3 pages.
Office Action mailed Feb. 2, 2010 in U.S. Appl. No. 11/793,010 (10 pages).
Final Office Action mailed Sep. 16, 2010 in U.S. Appl. No. 11/793,010 (11 pages).
European Patent Office, PCT International Search Report and Written Opinion for international application No. PCT/IT2004/000732.
Office Action mailed May 20, 2010 in U.S. Appl. No. 11/793,005 (11 pages).
Final Office Action mailed Jan. 20, 2011 in U.S. Appl. No. 11/793,005 (12 pages).
European Patent Office, PCT International Search Report and Written Opinion for international application No. PCT/IT2004/000730.
First Examination Report for the India Intellectual Property Office, mailed Jul. 10, 2014, in corresponding Application No. 2629/DELNP/2007, 2 pages.

* cited by examiner

METHOD AND APPARATUS FOR MANUFACTURING PNEUMATIC TYRES

CROSS REFERENCE TO RELATED APPLICATIONS

This application is a division of application Ser. No. 11/793,010, filed Sep. 25, 2008 now U.S. Pat. No. 8,007,710, which is a national phase application based on PCT/IT2004/000732, filed Dec. 28, 2004, all of which are incorporated herein by reference.

The present invention relates to a method and an apparatus for manufacturing pneumatic tyres for vehicle wheels.

In a tyre production cycle it is provided that, subsequently to a building cycle in which the different tyre components are manufactured and/or assembled, a moulding and vulcanisation process be carried out which is aimed at defining the tyre structure according to a desired geometry, usually having a particular tread pattern.

To this aim, the tyre is closed into a moulding cavity defined internally of a vulcanisation mould and conforming in shape to the geometric configuration of the outer surfaces of the tyre to be obtained.

A pneumatic tyre generally comprises a carcass structure of a ring-shaped toroidal conformation, including one or more carcass plies strengthened with reinforcing cords lying in radial planes, i.e. in planes containing the rotation axis of the tyre. Each carcass ply has its ends rigidly associated with at least one metallic annular anchoring structure, usually known as bead core, constituting the reinforcement to the beads, i.e. to the radially internal ends of said tyre, the function of which is to enable assembling of the tyre with a corresponding mounting rim. A band of elastomeric material referred to as tread band is applied-crownwise to said carcass structure, and in said tread band at the end of the vulcanisation and moulding steps a raised pattern is formed for ground contact. Placed between the carcass structure and the tread band is a reinforcing structure currently known as belt structure. This belt structure usually comprises, in the case of tyres for cars, at least two radially superposed strips of rubberised fabric provided with reinforcing cords, usually of metal, disposed parallel to each other in each strip and crossed with the cords of the adjacent strip, preferably symmetrically disposed relative to the equatorial plane of the tyre. Preferably said belt structure, at least on the ends of the underlying strips, further comprises a third layer of textile or metallic cords that are circumferentially disposed (at 0 degrees), at a radially external position.

Respective sidewalls of elastomeric material are also applied to the side surfaces of the carcass structure, each extending from one of the side edges of the tread band until close to the respective annular anchoring structure to the beads.

Finally, in tyres of the tubeless type, i.e. devoid of air tube, there is the presence of a radially internal layer having impermeability features to ensure airtightness to the tyre, said layer being generally referred to as "liner".

To the aims of the present description it is to be pointed out herein that by the term "elastomeric material" it is intended a composition comprising at least one elastomer polymer and at least one reinforcing filler. Preferably, this composition further comprises additives such as cross-linking agents and/or plasticizers. Due to the presence of the cross-linking agents, this material can be cross-linked through heating, so as to form the final article of manufacture.

There are moulding and vulcanisation methods in which a green tyre is set within the mould, being placed on a substantially rigid toroidal support. Said methods are preferably used for tyres that, based on recent manufacturing processes, are produced starting from a limited number of elementary semi-finished products fed onto a toroidal support the outer profile of which is coincident with that of the radially internal surface of the tyre that is wished to be produced. Said toroidal support is moved, preferably by a robotized system, between a plurality of stations in each of which through automated sequences, a particular tyre manufacturing step is carried out (see document EP 0 928 680 in the name of the same Applicant, for example).

The European Patent Application issued under No. 0 976 533 in the name of the same Applicant discloses a method and an apparatus for moulding and curing tyres for vehicle wheels in which a green tyre manufactured on a toroidal support is enclosed in the moulding cavity of a vulcanisation mould; subsequently, steam or other fluid under pressure is fed into at least one gap for fluid diffusion created between the outer surface of the toroidal support and the inner surface of the tyre, thereby imposing a radial expansion to said tyre that causes pressing of the latter against the inner surfaces of the moulding cavity. Following this pressing operation, suitable forming ridges set in the moulding cavity penetrate into the elastomeric material in the region of the tread band, to generate recesses and grooves such disposed as to form a desired tread pattern.

By a method of the above described type, the cured tyre can however show some faults, because the steam or other working fluid used for vulcanisation comes into direct contact with the innermost layer of the tyre, as for tyres directly assembled and cured on the same toroidal support, there is not the effect of the vulcanisation bladder normally used when vulcanisation is carried out on tyres built by assembling semifinished components without the aid of a toroidal support.

To overcome these drawbacks, the Applicant has already put into practice the above described methods through the teachings of document WO 2004/045837 according to which a green tyre is submitted to a preliminary step of pressing it against the toroidal support while simultaneously administering heat, to obtain at least partial vulcanisation of the innermost layer of the tyre itself and of the bead region. In this manner it is possible to subsequently carry out a moulding and vulcanisation step while expanding the tyre against the outer surfaces of the moulding cavity, without involving lack of homogeneity and of evenness in that tyre portion that is in contact with the toroidal support, which portion is the first to come into contact with the working fluid during vulcanisation. The working fluid used in the moulding and vulcanisation step in fact comes into contact with parts of the tyre that have already been partly cured and in which therefore the behaviour of the material is no longer plastic but almost elastic, thereby withstanding the fluid action without experiencing deterioration or deformations.

The Applicant has however perceived that also in the above described vulcanisation methods submitting the tyre to a preliminary pressing treatment against the toroidal support, surface unevennesses in the radially external parts of the tyre can occur, at least under particular work conditions.

According to the Applicant's perception, in fact, the preliminary pressing step against the toroidal support, aimed at obtaining an at least partial cross-linking of the inner tyre surface, can also cause partial cross-linking of the radially external surface portions of the tyre itself.

In more detail, the Applicant has noticed that closure of the tyre into the moulding cavity can cause the tread band to be partially penetrated by the forming ridges set in the moulding cavity for the purpose of creating the tread pattern so that, as a result, heat transfer and partial cross-linking of the tyre regions directly in contact with the forming ridges occur during the preliminary pressing step. Consequently, unevennesses are created in the elastomeric material constituting the tread band and correct adaptation of the material itself to the conformation of the moulding cavity during the subsequent moulding and vulcanisation step is impaired.

The Applicant has further observed that part of the fluid under pressure, nitrogen for example, admitted into the mould to cause the preliminary pressing treatment against the toroidal support can be entrapped between the outer surface of the tread band and the moulding cavity, in the grooves delimited by the forming ridges to form the pattern blocks on the tyre tread band. Therefore gaseous pockets are created that can be hardly evacuated during the subsequent moulding and vulcanisation step and can cause geometric unevennesses in the finished product.

The Applicant has therefore realised that the above described problems can be overcome by avoiding the forming ridges coming into contact with the radially external surface of the tyre tread band in the period elapsing between closure of the tyre into the moulding cavity and the moulding and vulcanisation step of said tyre against the walls of the moulding cavity itself.

In accordance with the present invention, the Applicant has found that by keeping the forming ridges radially spaced apart from the radially external surface of the tread band during said preliminary pressing step against the toroidal support following closure of the moulding cavity, the elastomeric material is prevented from prematurely cross-linking in the outermost layers of the tyre thus impairing a correct implementation of the moulding step.

Subsequently, the forming ridges are moved close to the tread band when the tyre moulding and vulcanisation step begins, with possible expansion of said tyre against the moulding cavity.

Also avoided are geometrical faults due, to fluid stagnation between the radially external surface of the tread band and the grooves delimited between the forming ridges.

In more detail, in accordance with a first aspect, the invention relates to a method of manufacturing pneumatic tyres for vehicle wheels, comprising the steps of: setting a green tyre comprising a tread band having a radially external surface, on a toroidal support provided with an outer surface conforming in shape to an inner surface of the tyre itself; setting a vulcanisation mould having a moulding cavity circumscribed by centripetally-approachable circumferential sectors, carrying forming ridges facing a geometric axis of the moulding cavity; closing the tyre into the moulding cavity; pressing the tyre against the outer surface of the toroidal support; administering heat to the inner surface of the tyre pressed against the toroidal support, keeping the circumferential sectors spaced apart from the radially external surface of the tread band; centripetally approaching the circumferential sectors of the mould to cause at least partial penetration of the forming ridges into the radially external surface of the tread band of the tyre; pressing the radially external surface of the tread band of the tyre against a radially internal surface of the moulding cavity; administering heat to the tyre penetrated by the forming ridges of the circumferential sectors.

In accordance with a second aspect, the invention relates to an apparatus for manufacturing pneumatic tyres for vehicle wheels, comprising: a toroidal support having an outer surface conforming in shape to the inner surface of a green tyre under working comprising a tread band provided with a radially external surface; devices for arranging the green tyre on the toroidal support; a vulcanisation mould having a moulding cavity circumscribed by centripetally-approachable circumferential sectors carrying forming ridges facing the geometric axis of the moulding cavity; devices for closing the tyre into the moulding cavity; devices for pressing the tyre enclosed in the moulding cavity against the outer surface of the toroidal support; first devices for administering heat to the inner surface of the tyre pressed against the toroidal support; devices for pressing the radially external surface of the tread band of the tyre against a radially internal surface of the moulding cavity; driving devices to be activated subsequently to closure of the tyre into the moulding cavity to cause translation of the circumferential sectors between a first work condition at which the forming ridges are radially spaced apart from the radially external surface of the tread band of the tyre enclosed in the moulding cavity, and a second work condition at which the forming ridges penetrate at least partly into the radially external surface of the tread band; second devices for administering heat to the tyre penetrated by the forming ridges of the circumferential sectors.

Further features and advantages will become more apparent from the detailed description of a preferred, but not exclusive, embodiment of a method of manufacturing tyres and an apparatus for putting said method into practice, in accordance with the present invention.

This description will be set out hereinafter with reference to the accompanying drawings, given by way of non-limiting example, in which.

With reference to the drawings, a moulding and curing apparatus for tyres of vehicle wheels in accordance with the present invention has been generally denoted at 101.

Apparatus 101 comprises a vulcanisation mould 102 operatively associated with a casing 103 and having a lower sidewall plate 130a and an upper sidewall plate 130b in engagement with a base 103a and a closing portion 103b of casing 103 respectively, or other suitable devices to close a tyre under working 50 into the mould itself.

Figure 1:
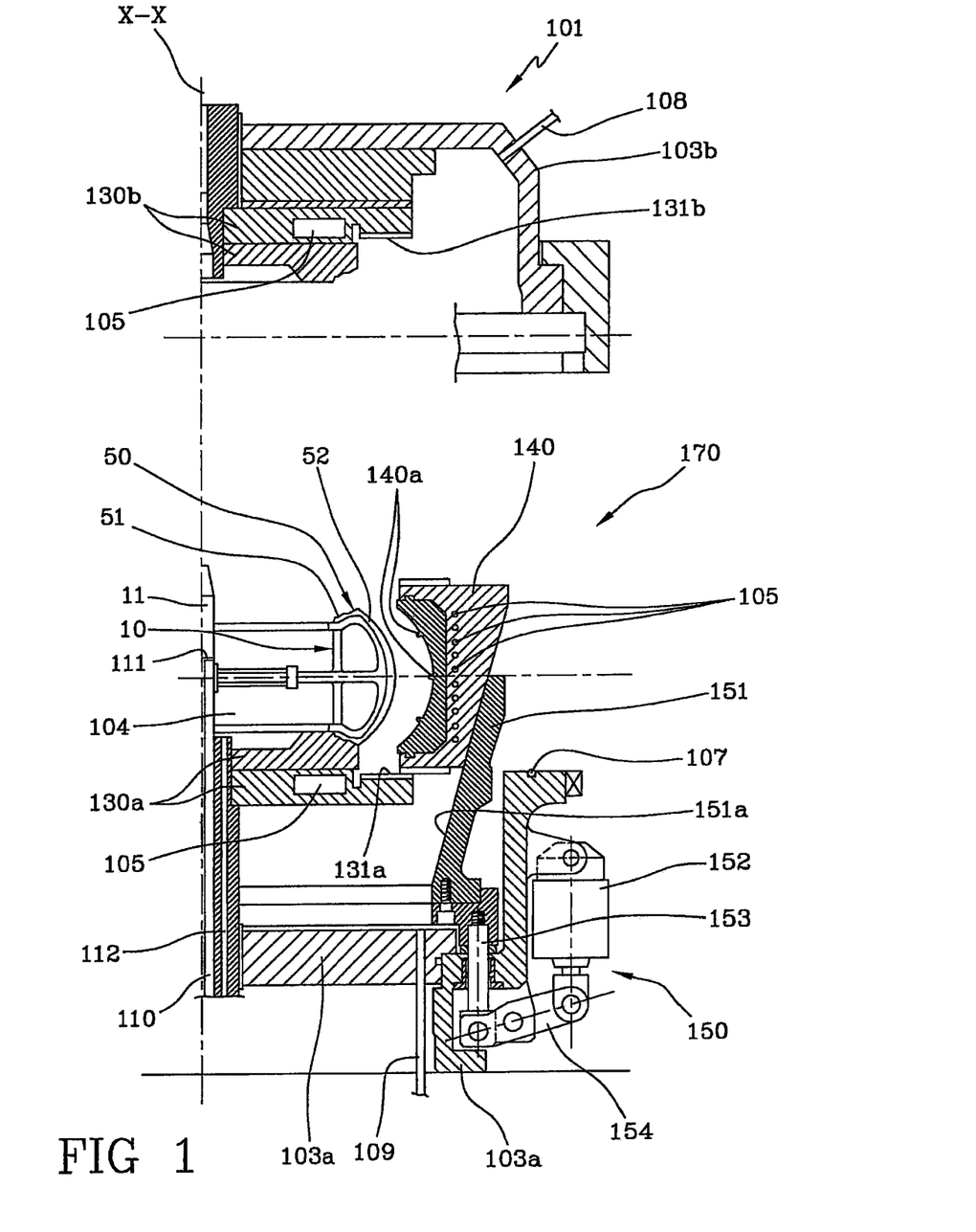
FIG. 1 is a fragmentary diametrical section view of a moulding and curing apparatus in accordance with the present invention, set in an open condition to enable introduction and removal of a tyre under working.
Figure 2:
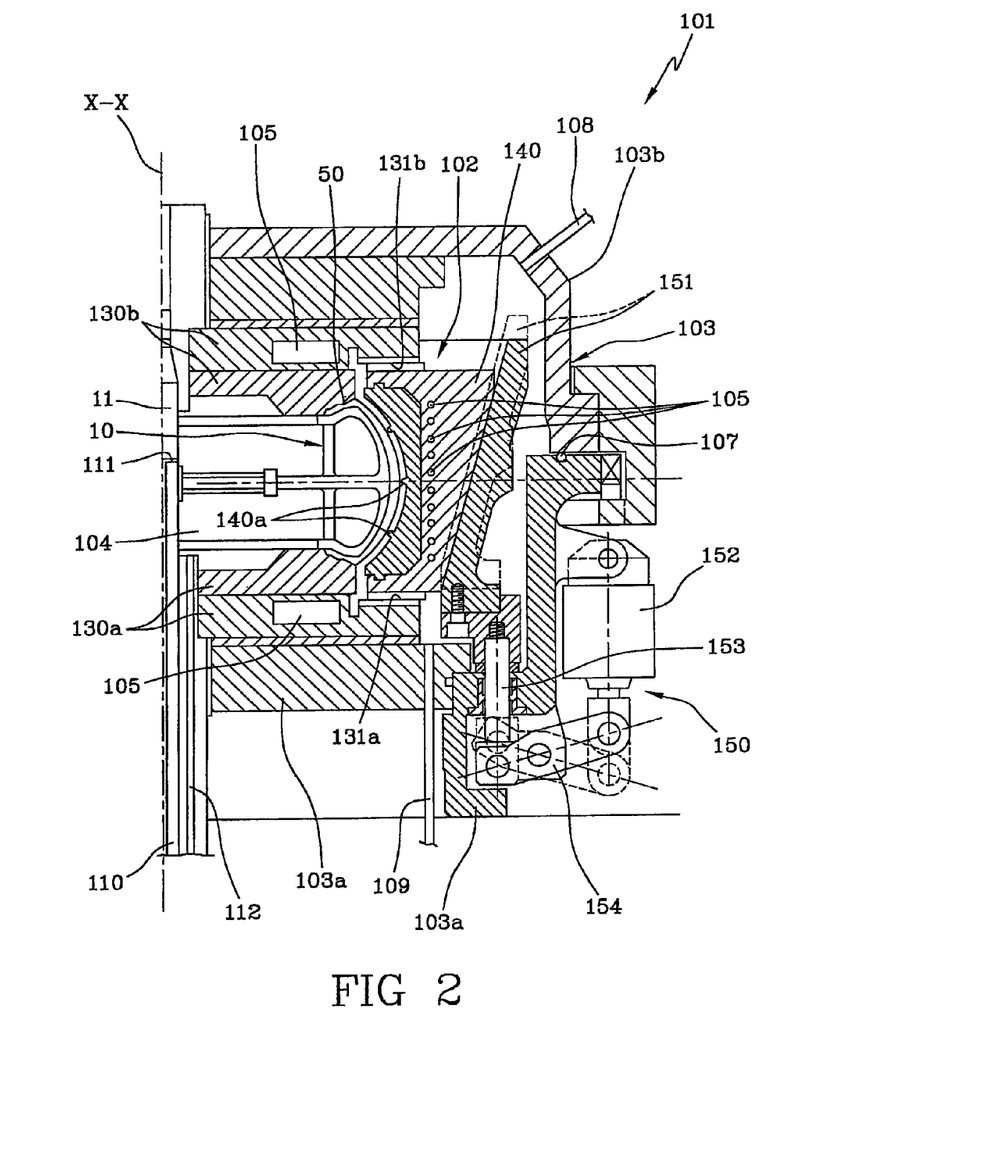
FIG. 2 shows the apparatus in FIG. 1 in a closed condition, in a step of pressing the tyre under working against the outer surface of a toroidal support.
Figure 3:
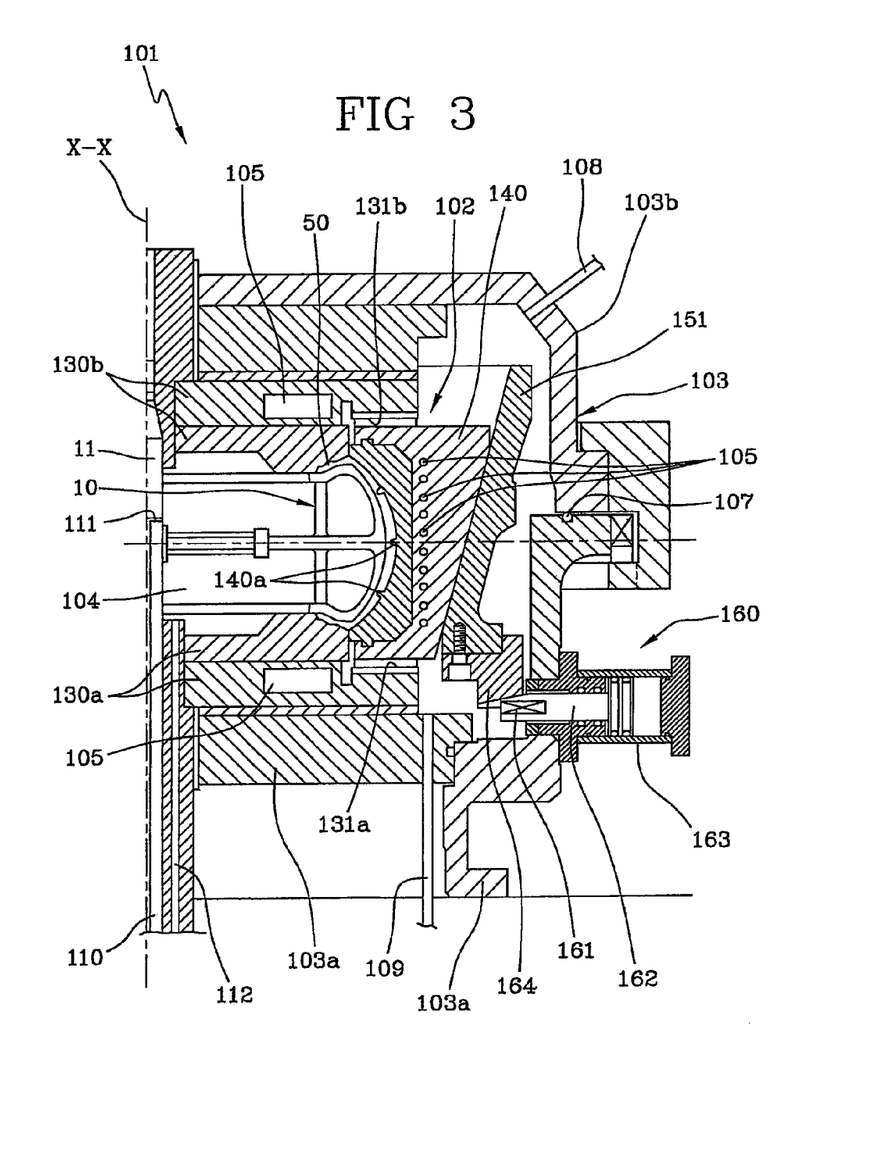
FIG. 3 shows the apparatus in a step subsequent to that in FIG. 2, in a different diametrical section plane, during pressing of the tyre against the inner surfaces of the moulding cavity.

The base 103a and the closing portion 103b, together with the respective lower 130a and upper 130b sidewall plates are in fact movable relative to each other between an open condition at which they are mutually spaced apart as shown in FIG. 1, to enable introduction of the tyre 50 to be cured into the mould 102, and a closed position at which, as shown in FIGS. 2 and 3, they are disposed close to each other to enclose tyre 50 in a moulding cavity 104 having inner walls reproducing the geometrical configuration to be given to the tyre at the end of the moulding and curing process.

In detail, sidewall plates 130a, 130b face each other and are set to operate against the opposite sides of the tyre, so as to form the outer surfaces of the tyre sidewalls 51. Mould 102 further comprises at least one crown of circumferential sectors 140 circumscribing the moulding cavity 104 and carrying forming ridges 140a turned towards a geometric axis X-X of the moulding cavity. The circumferential sectors 140 are set to operate on a radially external surface of a so-called tread band 52 of tyre 50, to create a series of cuts and longitudinal and/or transverse grooves therein that are suitably disposed according to a desired "tread pattern".

Preferably, sidewall plates 130a, 130b each have perimetral abutment surfaces 131a, 131b that, at least in the closed condition, slidably engage with the circumferential sectors 140, so as to allow radial movement of the latter relative to the geometric axis X-X of the moulding cavity 104. This slidable engagement can be obtained by flat abutment surfaces peripherally formed on each of the sidewall plates 130a, 130b and operating at axially opposite positions on each of the circumferential sectors 140. Further associated with the circumferential sectors 140 are driving devices 150 to be activated after tyre 50 has been closed into the moulding cavity 104, i.e. when sidewall plates 130a, 130b are in the closed condition, to cause radial translation of the circumferential sectors between a first work condition at which, as shown in FIG. 2, they are radially spaced apart from the geometric axis X-X of the moulding cavity, and a second work condition at which, as shown in FIG. 3, the circumferential sectors 140 are moved radially close to said geometric axis X-X, preferably in circumferential abutment relationship against each other.

In more detail, as shown in FIG. 2, in the first work condition the forming ridges 140a carried by the circumferential sectors 140 are radially spaced apart from the radially external surface of the tread band 52 of tyre 50, whereas in the second work condition the circumferential sectors 140 are radially approached so that the forming ridges 140a penetrate at least partly into the tread band 52.

Preferably, the driving devices 150 comprise at least one sector-carrying ring 151, that is axially movable relative to the moulding cavity 104 and has at least one frustoconical surface 151a slidably engaging the circumferential sectors 140 to cause radial translation of the latter between the first and second work conditions, following an axial movement of the sector-carrying ring itself. Axial movement of each sector-carrying ring 151 can be obtained by means of pusher members operating on control rods 153 slidably engaged through the casing 103 of mould 102. More particularly, in the embodiment herein shown the pusher members comprise a plurality of first fluid-operated actuators 152 that are circumferentially distributed and externally fastened to the base 103a. Each actuator 152 operates on the respective control rod 153 by means of an idler arm 154 pivoted on the base 103a. Also provided can be locking devices 160 to be activated for fixing positioning of the circumferential sectors 140 to the second work position. These locking devices 160 can for example comprise one or more stop blocks 161, carried by auxiliary control rods 162, slidably engaged through the casing 103, and movable upon command of auxiliary actuators 163 between a first work position at which they release axial movement of the sector-carrying ring and a second work position at which they act against a radial shoulder 164 carried by the sector-carrying ring itself to lock the latter to the second work position as shown in FIG. 3. The stop blocks 161 can operate in thrust relationship against at least one frustoconical surface exhibited by the radial shoulder 164 so as to exert a constant action on the sector-carrying ring 151 in order to maintain the circumferential sectors 140 centripetally pushed towards axis X-X.

Preferably, at least one of the sidewall plates, the lower sidewall plate 130a in the example herein shown, is axially movable relative to the casing 103 when the mould 102 is in an open condition, so as to carry out axial translation of the circumferential sectors 140 along the frustoconical surface 151a of the sector-carrying ring 151 to cause further radial moving apart of the latter starting from the above described first work condition. Radial moving apart of the circumferential sectors 140 with mould 102 in the open condition is of an extent sufficient to enable easy introduction of tyre 50 to be cured and/or extraction of the cured tyre through an access opening 170 defined between the upper 130b and lower 130a sidewall plates in the open condition, without involving mechanical interferences between the tyre and the circumferential sectors.

Apparatus 101 further contemplates use of at least one toroidal support 10 of metal material or other substantially rigid material, having an outer surface substantially reproducing the shape of the inner surface of tyre 50. The toroidal support 10 conveniently consists of a drum that can be split up, i.e. made up of circumferential sectors at least some of which are centripetally movable to dismantle the toroidal support itself and enable easy removal of same from tyre 50 when working has been completed.

Apparatus 101 further involves at least one duct 110 to feed a primary working fluid under pressure, such as steam, nitrogen or other substantially inert gas or a mixture thereof, to be used, as better illustrated in the following, for tyre moulding and curing.

Also preferably present in apparatus 101 are heating devices for the mould 102, preferably in the form of a plurality of ducts 105 for passage of a heating fluid, associated with the sidewall plates 130a, 130b and/or the circumferential sectors 140, respectively.

Preferably, also present in apparatus 101 is a hermetically sealed device suitable to contain the toroidal support 10 on which a green tyre 50 has been previously built.

As shown in the accompanying drawings, said hermetically sealed device can be, in a preferred embodiment, enclosed and integrated into said mould 102 defining a hermetically sealed cavity within the mould itself. Preferably, said mould 102 in this case comprises at least one circumferential gasket 107 put on the opposite surfaces of base 103a and of the closing portion 103b.

Said circumferential gasket 107 can be embodied by an O-ring or preferably a series of superposed metal rings having a sealing element placed between the opposite surfaces thereof and able to resist pressures and temperatures as required by the method described in the following.

A device for feeding a secondary working fluid such as air, nitrogen or other substantially inert gases, is operatively associated with said mould 102. Said device comprises at least one delivery duct 108 and one exhaust duct 109 for feeding and evacuating said secondary working fluid under pressure to and from said mould 102 respectively, for pressing the inner surface of said green tyre 50 from inside to outside against the outer surface of said toroidal support 10, as better described in the following.

Duct 110 is operatively associated with at least one passage device by a connecting duct 111 for example, that is formed in at least one of the centering shanks 11 of said toroidal support 10, to enable spreading of said primary working fluid under pressure within said toroidal support 10.

Said passage device is provided with suitable branches formed in the toroidal support 10 and by which said primary working fluid reaches a plurality of ducts (not shown) opening onto the outer surface of the toroidal support itself, through the gaps present between said circumferential sectors of the toroidal support 10, for example.

Preferably, a duct 112 adapted to evacuate the primary working fluid and/or possible condensate is then provided at the lower part of said moulding cavity 104. In accordance with the method of the invention, the green tyre 50 is disposed on the toroidal support 10 before the latter is introduced together with the tyre itself, into the vulcanisation mould 102 set in the open condition.

In particular, arrangement of tyre 50 on the toroidal support 10 can be conveniently obtained by manufacturing the tyre directly on the support itself. In this manner the toroidal support 10 is advantageously utilised as a rigid shape for forming the different components such as liner, carcass plies, reinforcing structures to the beads, belt strips, sidewalls 51 and tread band 52 co-operating in forming tyre 50. More specifically, said components of tyre 50 are preferably made by suitable working units carrying out laying on said toroidal support 10 of elementary semi-finished products such as, by way of example, continuous elongated elements of elastomeric materials and strip-like elements of elastomeric material internally comprising at least one textile or metallic cord. For example, the tread band 52 can be obtained by winding said continuous elongated element of elastomeric material around the rotation axis of the toroidal support 10, in the form of coils disposed in side by side and/or superposed relationship or following another predetermined path.

Further details on the modes of laying the components of tyre 50 on the toroidal support 10 are for example described in the European Patent Application issued under No. 0 929 680 in the name of the same Applicant.

The toroidal support 10 carrying the green tyre 50 is transferred to the inside of mould 102 manually or with the aid of a robotized arm (not shown) or in any other manner, through the opening access 170 defined between the upper 130b and lower 130a sidewall plates in the open condition. The lower sidewall plate 130a, first in a raised position to keep the circumferential sectors 140 in a condition of maximum radial spacing from each other, is lowered into the base 103a, to allow tyre 50 to be closed into the mould 102, following axial approaching of the upper sidewall plate 130b carried by the closing portion 103b of casing 103.

When closure has been completed, the circumferential sectors 140 are in the first work condition, the forming ridges 140a being spaced apart from the radially external surface of the tread band 52 of tyre 50.

Through duct 108 said secondary fluid under pressure is sent into the moulding cavity 104. The secondary working fluid therefore takes up the space included between the outer surface of said green tyre 50 and the inner surface of the moulding cavity 104. Substantially simultaneously, said primary working fluid under pressure is sent into said toroidal support 10 at a lower pressure than that of said secondary working fluid. After a short transient stage, the pressure differential resulting from what above illustrated is preferably maintained for some minutes. Since the primary working-fluid is at a lower pressure, it will stay at the inside of said toroidal support 10 without escaping from the previously described ducts formed therethrough. In this way, during this step the green tyre 50 is pressed from outside to inside, so that the inner surface thereof preferably comprising the liner is pressed against the outer surface of the toroidal support 10.

Preferably said primary working fluid, that in this step is preferably formed of steam, is fed to a temperature generally included between about 170° C. and 210° C.

During said period of time, the primary working fluid heats the toroidal support 10 and the latter transmits heat to the inner surface of the tyre, then to the region of the beads and preferably to the liner.

In addition or as an alternative to the primary working fluid conveyed through the feeding duct 110, different devices for administering heat to the inner surface of the tyre can be provided, and they for example comprise electric resistors for heating the toroidal support 10.

Heating carried out through the toroidal support 10 does not fully cure said parts of tyre 50 but in any case it is sufficient to give the parts themselves elasticity features. In particular, the carcass ply or plies are well anchored to the beads, and the inner surface of the tyre, preferably the liner, becomes elastic enough to withstand the subsequent pressures of the moulding and curing process illustrated in the following, without being torn.

This pressing step of tyre 50 against the outer surface of the toroidal support 10, and simultaneous administration of heat to the inner surface of the tyre itself, terminates with evacuation of the secondary working fluid by means of the exhaust duct 109.

It will be appreciated that the absence of a direct contact between the forming ridges 140a and the tread band 52 during the pressing step of tyre 50 against the toroidal support 10 eliminates the risk of directly transmitting heat to the outer surface of the tread band 52. Therefore triggering of premature cross-linking on the tread band 52, which will give rise to footprints different from the desired ones on the finished tyre, is avoided, also due to a "memorisation" effect of the shape and position of the coils formed by the continuous elongated element wound on the toroidal support so as to form the tread band 52.

In addition, the distance between the forming ridges 140a and the tread band 52 facilitates evacuation of the secondary working fluid under pressure from the moulding cavity 104 at the end of the pressing step of the tyre against the toroidal support 10, without any risk of forming stagnation of fluid under pressure between the outer surface of the tread band 52 and the moulding cavity itself, in the spaces circumscribed by the forming ridges 140a. In addition, also the space between the circumferential sectors 140 due to the fact that they remain in the first work condition, promotes quick evacuation of the secondary working fluid under pressure between tyre 50 and the moulding cavity 104.

When the pressing step has been completed with evacuation of the working fluid utilised as above illustrated, the driving devices 150 are operated and they cause a centripetal approaching of the circumferential sectors 140 from the first to the second work condition at which the forming ridges 140a penetrate at least partly into the tread band 52. It will be recognised that in the apparatus in accordance with the invention the centripetal movement of the circumferential sectors 140 is therefore uncoupled from the movement consequent to the step of closing mould 102 between the base 103a and closing portion 103b.

The auxiliary blocks 161a, 161b are driven by the respective actuators 163a, 163b to fix positioning of the circumferential sectors 140 to the second work condition, until the end of the subsequent step aimed at complete moulding and curing of tyre 50, which operation starts concurrently with fixing of the circumferential sectors 140 to the second work condition.

The above step starts by increasing the pressure of said primary working fluid to a value included between about 18 and about 35 bars, preferably between about 26 and about 28 bars, in order to mould and cure tyre 50 with the desired pulling strength on the carcass ply.

During this step the primary working fluid preferably comprises a steam and nitrogen mixture, even if it can consist of either steam alone or steam admixed with air or other substantially inert gases, or also of one or more gases such as air, nitrogen and other substantially inert gases.

The pressure generated by said primary working fluid reaches a diffusion gap (not shown) created between the outer surface of the toroidal support 10 and the inner surface of the tyre to be cured.

In a preferential alternative embodiment, the diffusion gap is created directly following expansion of the tyre caused by effect of the thrust exerted by said primary working fluid.

Thus pressing of the tyre against the walls of the moulding cavity 104 is carried out concurrently with an expansion imposed to the tyre itself, until bringing the outer surface of the latter to fully adhere to the inner walls of the moulding cavity 104, the forming ridges 140a fully penetrating into the tread band 52. Since the elastomeric material forming the tread band 52 is in a raw state, i.e. devoid of important cross-linking triggers, perfect adaptation and optimal contact of the material itself against the inner walls of the moulding cavity 104 is obtained.

In addition, said pressing action takes place concurrently with administration of heat to cause cross-linking of the elastomeric material forming tyre 50 and the consequent geometric and structural definition of the tyre itself.

Advantageously, said primary working fluid determining the desired pressure, while enabling moulding of the tyre also supplies the necessary heat for vulcanisation.

The invention claimed is:

1. A tyre manufacturing apparatus, comprising:
a toroidal support having an outer surface conformal to the shape of the inner surface of a tyre under working, the tyre under working comprising a tread band provided with a radially external surface;
arranging devices configured to arrange the tyre on the toroidal support;
a vulcanisation mould having a pair of axially opposite sidewall plates and a moulding cavity circumscribed by centripetally-approachable circumferential sectors carrying forming ridges facing a geometric axis at a radial center of the moulding cavity;
a casing having a base portion and a closing portion each carrying one of the sidewall plates and movable relative to each other between an open condition at which the base portion and the closing portion are mutually spaced apart to enable introduction of the tyre into the mould, and a closed position, at which the base portion and the closing portion abut against each other, for closing the tyre into the moulding cavity;
first pressing devices configured to press the tyre enclosed in the moulding cavity against the outer surface of the toroidal support;
first heat administering devices configured to administer heat to the inner surface of the tyre pressed against the toroidal support;
second pressing devices configured to press the radially external surface of the tread band of the tyre against a radially internal surface of the moulding cavity;
driving devices configured to be activated subsequently to closure of the tyre into the moulding cavity to cause translation of the circumferential sectors between a first work condition at which the forming ridges are radially spaced apart from the radially external surface of the tread band of the tyre enclosed in the moulding cavity, and a second work condition at which the forming ridges penetrate at least partly into the radially external surface of the tread band, wherein the driving devices comprise a sector-carrying ring having a cone-shaped surface slidably engaging said circumferential sectors to cause translation of the sectors between said first and second work conditions following an axial movement of the sector-carrying ring, the driving devices further comprising control rods which slide through the casing under the actuation of fluid-operated actuators that are fastened to the casing and operate on the controls rods through idler arms pivotably mounted on the casing to achieve the axial movement of the sector-carrying ring; and
second heat administering devices configured to administer heat to the tyre penetrated by the forming ridges of the circumferential sectors;
wherein said driving devices are configured to keep the circumferential sectors at the first work condition during operation of said first pressing devices and first heat administering devices, and keep the circumferential sectors at the second work condition during operation of said second pressing devices and second heat administering devices;
wherein the circumferential sectors are radially closer to the geometric axis of the moulding cavity in the second work condition than in the first work condition; and
wherein one of the sidewall plates is configured to move so that the circumferential sectors slide against the cone-shaped surface and thereby cause radial moving apart of the circumferential sectors while the casing is brought in the open condition.

2. The apparatus as claimed in claim 1, wherein each of said pair of axially opposite side all plates are axially movable relative to each other.

3. The apparatus as claimed in claim 2, wherein each of said sidewall plates has perimetral abutment surfaces slidably engaging with the circumferential sectors at least in the closed condition, to enable movement of the circumferential sectors between the respective first and second work conditions.

4. The apparatus as claimed in claim 1, wherein said control rods are configured to move linearly.

5. The apparatus as claimed in claim 1, further comprising locking devices to be activated for fixing the positioning of the circumferential sectors to the second work condition.

6. The apparatus as claimed in claim 5, wherein said locking devices comprise a stop block carried by an auxiliary control rod slidably engaged through the casing of said mould and movable upon command of an auxiliary actuator between a first work position at which it releases the axial movement of the sector-carrying ring and a second work position at which it acts against a radial shoulder that is carried by the sector-carrying ring to lock the circumferential sectors to the second work condition.

7. The apparatus as claimed in claim 6, wherein said stop block operates in thrust relationship against at least one frustoconical surface exhibited by the radial shoulder so as to exert an action on the sector-carrying ring tending to centripetally push the circumferential sectors toward the geometric axis of the moulding cavity.

8. The apparatus as claimed in claim 1, wherein said second heat administering devices comprise at least one duct for feeding a primary working fluid into the toroidal support.

9. The apparatus as claimed in claim 1, wherein said second pressing devices comprise at least one duct for feeding a primary fluid into a diffusion gap between the outer surface of the toroidal support and the inner surface of the tyre.

10. The apparatus as claimed in claim 1, wherein said first pressing devices comprise at least one delivery duct for feeding a secondary fluid under pressure to the moulding cavity.

11. The apparatus as claimed in claim 1, wherein the first heat administering devices comprise electric resistors for heating the toroidal support.

12. The apparatus as claimed in claim 1, wherein the first heat administering devices comprise a duct for feeding a primary fluid into the toroidal support.

13. The apparatus as claimed in claim 1, wherein the arranging devices comprise working units designed to form components of the tyre directly on the toroidal support.

14. The apparatus as claimed in claim 1, wherein said circumferential sectors define a space configured for fluid to flow therebetween.

15. The apparatus as claimed in claim 14, wherein said space is configured to evacuate a secondary fluid at the first work condition.

16. The apparatus as claimed in claim 1, wherein the movement of said one of the sidewall plates is configured to cause radial moving apart of the circumferential sectors from the first work condition while said base portion and said closing portion mutually move from the closed position towards the open condition.

* * * * *